(12) United States Patent
Kataoka et al.

(10) Patent No.: US 10,401,658 B2
(45) Date of Patent: Sep. 3, 2019

(54) OPTICAL MODULATOR AND OPTICAL SWITCH

(71) Applicant: SUMITOMO OSAKA CEMENT CO., LTD., Tokyo (JP)

(72) Inventors: Toshio Kataoka, Tokyo (JP); Kei Kato, Tokyo (JP); Junichiro Ichikawa, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 242 days.

(21) Appl. No.: 15/504,254

(22) PCT Filed: Aug. 31, 2015

(86) PCT No.: PCT/JP2015/074649
§ 371 (c)(1),
(2) Date: Feb. 15, 2017

(87) PCT Pub. No.: WO2016/032002
PCT Pub. Date: Mar. 3, 2016

(65) Prior Publication Data
US 2017/0255032 A1    Sep. 7, 2017

(30) Foreign Application Priority Data

Aug. 29, 2014    (JP) ................................. 2014-175189

(51) Int. Cl.
*G02F 1/01* (2006.01)
*G02F 1/03* (2006.01)
(Continued)

(52) U.S. Cl.
CPC .............. *G02F 1/03* (2013.01); *G02F 1/0027* (2013.01); *G02F 1/025* (2013.01); *G02F 1/035* (2013.01); *G02F 1/0316* (2013.01); *G02F 1/225* (2013.01)

(58) Field of Classification Search
CPC .......... G02F 1/03; G02F 1/0027; G02F 1/025; G02F 1/0316; G02F 1/225; G02F 1/035;
(Continued)

(56) References Cited

U.S. PATENT DOCUMENTS

2012/0051683 A1*   3/2012   Sugiyama ............... G02F 1/035
                                                    385/1

FOREIGN PATENT DOCUMENTS

JP    06-308437 A    11/1994
JP    06308437 A  *  11/1994   ........... G02F 1/0356
(Continued)

OTHER PUBLICATIONS

International Search Report for PCT/JP2015/074649 (dated Nov. 10, 2015).

*Primary Examiner* — William R Alexander
*Assistant Examiner* — Henry A Duong
(74) *Attorney, Agent, or Firm* — Merchant & Gould P.C.

(57) ABSTRACT

Provided is an optical modulator including: a relay substrate; a first transmission line that is provided on a flat surface of the relay substrate, and transmits an electrical signal along the flat surface; a second transmission line that is provided separately from the relay substrate, is electrically connected to the first transmission line, and transmits, to the first transmission line, the electrical signal that has been input from an outer side in a direction that is not included in the flat surface; a modulation unit that modulates an optical signal by using the electrical signal that is transmitted by the first transmission line and the second transmission line; and a shield that shields a radiation component of the electrical signal that is radiated from the second transmission line.

6 Claims, 10 Drawing Sheets

(51) Int. Cl.
*G02F 1/00* (2006.01)
*G02F 1/025* (2006.01)
*G02F 1/035* (2006.01)
*G02F 1/225* (2006.01)

(58) Field of Classification Search
CPC .......... G02F 1/29; G02F 1/292; G02F 1/2955; G02F 1/31; G02F 1/313
USPC ........................................................ 359/320
See application file for complete search history.

(56) References Cited

FOREIGN PATENT DOCUMENTS

| JP | 07-221512 A | | 8/1995 |
|---|---|---|---|
| JP | 07221512 A | * | 8/1995 |
| JP | 09-093223 A | | 4/1997 |
| JP | 0993223 A | * | 4/1997 |
| JP | 2007-139987 | | 6/2007 |
| JP | 2012-048121 A | | 3/2012 |

* cited by examiner

OPTICAL MODULATOR AND OPTICAL SWITCH

TECHNICAL FIELD

The present invention relates to an optical modulator and an optical switch.

The present application is a National Stage Application under 35 U.S.C. § 371 of International Application No. PCT/JP2015/074649 filed Aug. 31, 2015, which claims the benefit of priority to Japanese Patent Application No. 2014-175189, filed Aug. 29, 2014, the disclosures of all of which are hereby incorporated by reference in their entireties. The International Application was published in Japanese on Mar. 3, 2016 as WO 2016/032002.

BACKGROUND ART

Recently, reduction in size of an optical transceiver (transponder) and reduction in cost thereof have progressed.

According to this, even in an optical modulator module that is mounted in an optical transceiver, a method, in which usage of a coaxial connector is avoided and a plurality of signal lines are collectively surface-mounted for connection, is employed in industry specifications (OIF2014.099.00).

In this regard, there is known an optical modulator module including an optical modulator including a signal electrode and a ground electrode, a conductive housing that accommodates the optical modulator and is electrically connected to the ground electrode of the optical modulator, a substrate in which a ground electrode that is connected to an external wall of the housing with solder or a conductive adhesive is formed on one surface, and a signal electrode is formed on the other surface, and a lead pin that electrically connects the signal electrode of the optical modulator and the signal electrode of the substrate (refer to Patent Literature No. 1).

In addition, there is known an optical modulator including a substrate having an electro-optic effect, an optical waveguide that is formed on the substrate, an optical modulation element including a modulation electrode configured to modulate light that passes through the inside of the optical waveguide, and a connection substrate that is disposed on an outer side of the substrate and supplies a microwave signal for driving the optical modulator element to the optical modulator element. A signal input end and a signal output end are formed on the connection substrate, and the connection substrate is provided with reimaging suppression means that suppresses recoupling of a radiation mode of the microwave signal, which is input to the signal input end, to the signal output end (refer to Patent Literature No. 2).

CITATION LIST

Patent Literature

Patent Literature No. 1: Japanese Laid-open Patent Publication No. 2012-48121
Patent Literature No. 2: Japanese Laid-open Patent Publication No. 2007-139987

SUMMARY OF INVENTION

Technical Problem

However, in the optical modulator module of the related art, transmission characteristics of an electrical signal, which is input to an optical modulator module, may deteriorate due to a cavity resonance phenomenon that is caused by a radiation component of the electrical signal that is radiated from a lead pin, which transmits the electrical signal input from an outer side to a signal electrode of a substrate, to the inside of the housing toward a vertically upward side or a vertically downward side.

Accordingly, the invention has been made inconsideration of the problem in the related art, and an object thereof is to provide an optical modulator and an optical switch which are capable of suppressing deterioration of transmission characteristics of an electrical signal.

Solution to Problem

According to an aspect of the invention, there is provided an optical modulator including: a relay substrate; a first transmission line that is provided on a flat surface of the relay substrate, and transmits an electrical signal along the flat surface; a second transmission line that is provided separately from the relay substrate, is electrically connected to the first transmission line, and transmits, to the first transmission line, the electrical signal input from an outer side in a direction that is not that of the flat surface; a modulation unit that modulates an optical signal by using the electrical signal that is transmitted by the first transmission line and the second transmission line; and a shield that shields a radiation component of the electrical signal that is radiated from the second transmission line.

In addition, according to another aspect of the invention, the optical modulator may further include a housing in which the relay substrate and the modulation unit are provided. The shield may be a member that is provided separately from the housing, and may be electrically connected to the housing.

In addition, according to still another aspect of the invention, in the optical modulator, the shield maybe a member that covers at least a radiation surface of the radiation component from the second transmission line.

In addition, according to still another aspect of the invention, in the optical modulator, the shield maybe a bonding wire that passes overhead at least the radiation surface of the radiation component from the second transmission line.

In addition, according to still another aspect of the invention, there is provided an optical switch including: a relay substrate; a first transmission line that is provided on a flat surface of the relay substrate, and transmits an electrical signal along the flat surface; a second transmission line that is provided separately from the relay substrate, is electrically connected to the first transmission line, and transmits, to the first transmission line, the electrical signal that has been input from an outer side in a direction that is not included in the flat surface; a modulation unit that modulates an optical signal by using the electrical signal that is transmitted by the first transmission line and the second transmission line; a shield that shields a radiation component of the electrical signal that is radiated from the second transmission line; and a switch that switches an output of the optical signal.

Advantageous Effects of Invention

According to the invention, it is possible to provide an optical modulator and an optical switch which are capable of suppressing deterioration of transmission characteristics of an electrical signal.

DESCRIPTION OF EMBODIMENTS

<First Embodiment>

Figure 1:
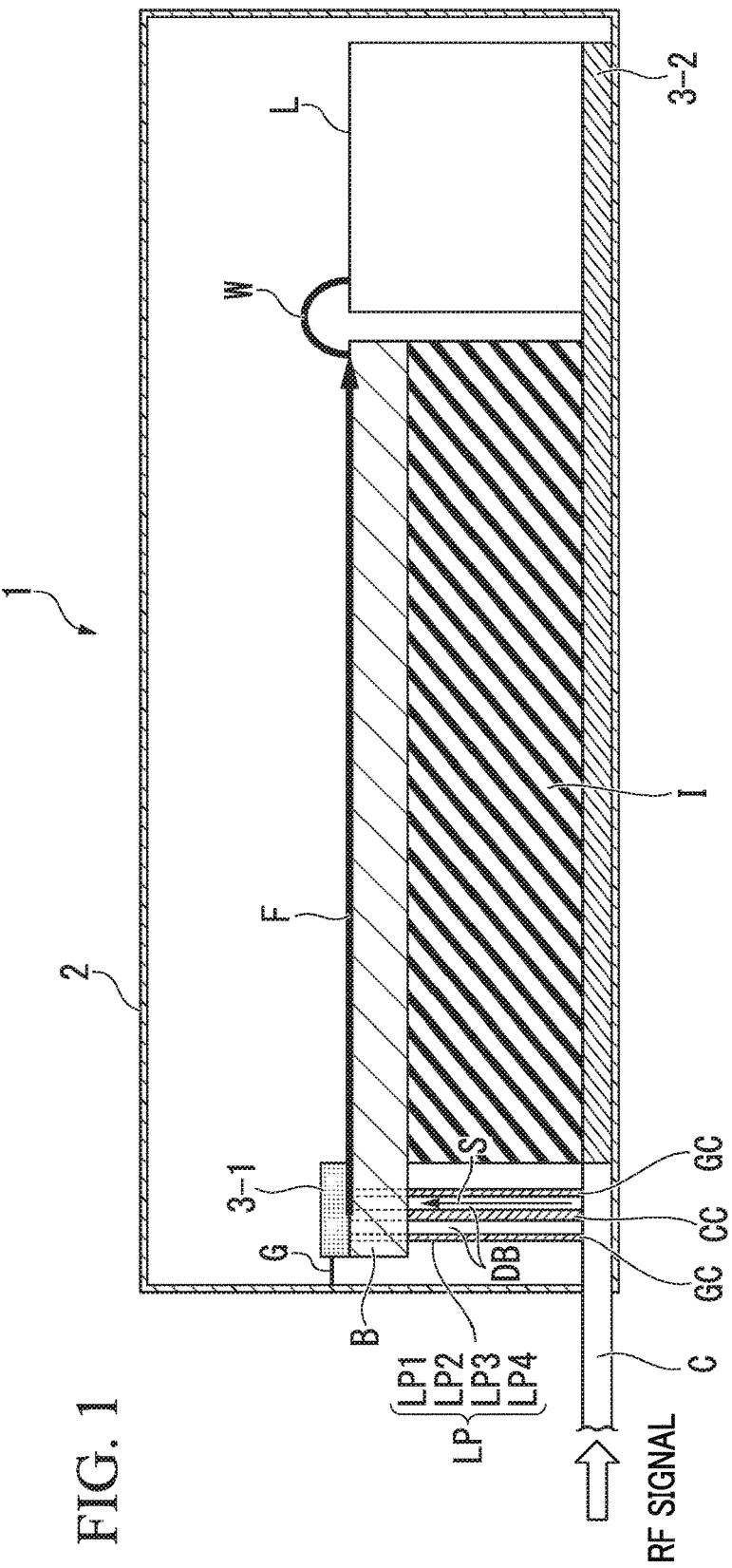
FIG. 1 is a cross-sectional view illustrating a configuration example of an optical modulator 1 according to a first embodiment.

Hereinafter, a first embodiment of the invention will be described with reference to the accompanying drawings. FIG. 1 is a cross-sectional view illustrating a configuration example of an optical modulator 1 according to the first embodiment. In addition, FIG. 2 is a view illustrating an example of the inside of the optical modulator 1 when the optical modulator 1 illustrated in FIG. 1 is seen from a vertically upward side to a vertically downward side.

Figure 2:
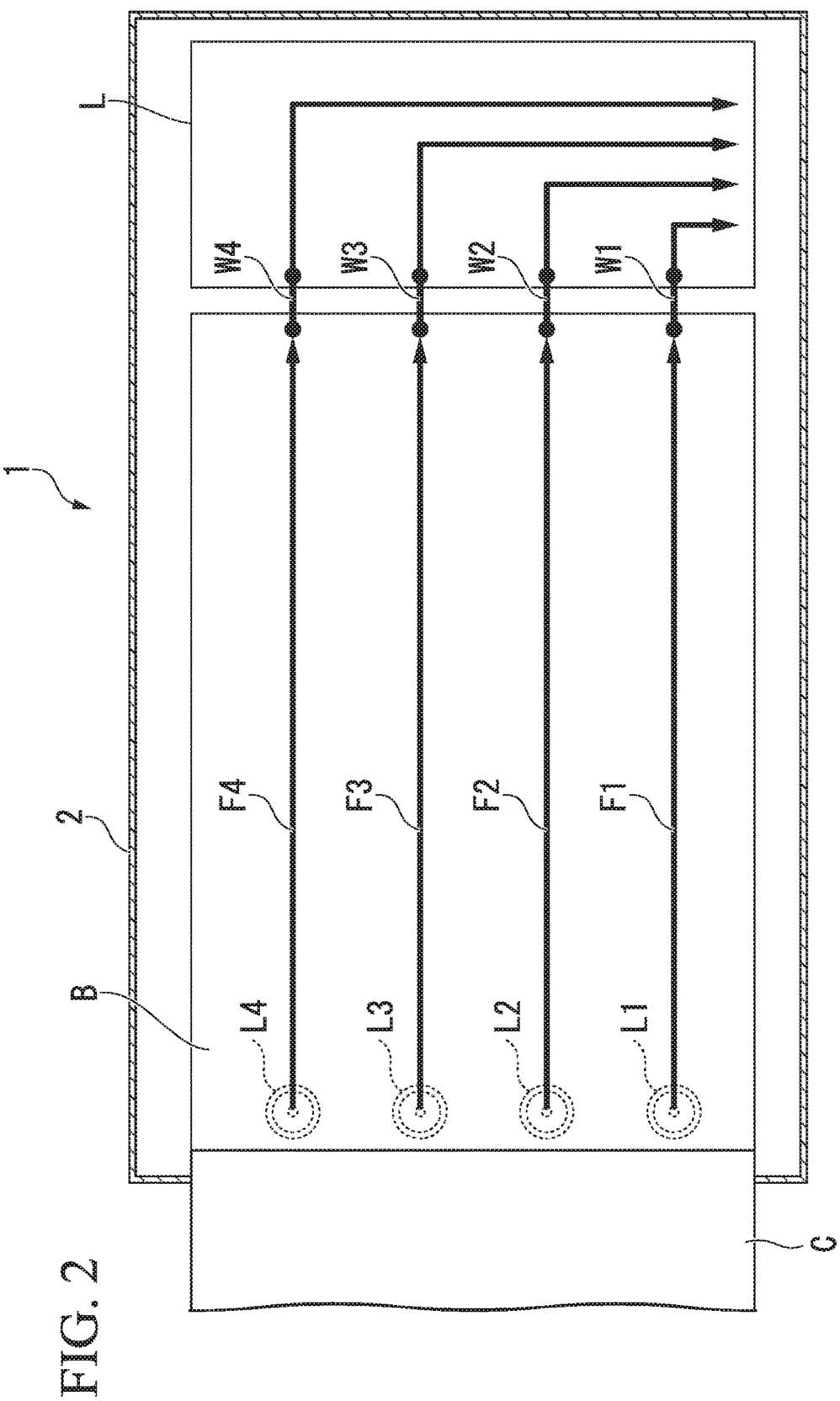
FIG. 2 is a view illustrating an example of the inside of the optical modulator 1 when the optical modulator 1 illustrated in FIG. 1 is seen from a vertically upward side to a vertically downward side.

Furthermore, in FIG. 2, a shield 3-1 is omitted for convenience of explanation.

For example, the optical modulator 1 is connected to a signal source and the like which are embedded in a transponder by a flexible cable C. As illustrated in FIG. 2, a radio frequency (RF) signal output from the signal source is input to the optical modulator 1 through lead pins LP1 to LP4. In FIG. 1, the lead pin LP1 to the lead pin LP4 overlap each other. Furthermore, in the following description, if it is not necessary to discriminate the lead pins LP1 to LP4 from each other, the lead pins LP1 to LP4 are collectively referred to as a lead pin LP for convenience of explanation.

The optical modulator 1 transmits the RF signal, which is input from the signal source, to an optical modulation section chip L through a lead pin LP, a relay substrate B, and a bonding wire W, and modulates an optical signal. At this time, the optical modulator 1 transmits the RF signal, which is input from the lead pin LP1, to the optical modulation section chip L through a transmission line F1 indicated by an arrow in FIGS. 1 and 2 and a bonding wire W1. In addition, the optical modulator 1 transmits the RF signal, which is input from the lead pin LP2, to the optical modulation section chip L through a transmission line F2 indicated by an arrow in FIGS. 1 and 2 and a bonding wire W2.

In addition, the optical modulator 1 transmits the RF signal, which is input from the lead pin LP3, to the optical modulation section chip L through a transmission line F3 indicated by an arrow in FIGS. 1 and 2 and a bonding wire W3. In addition, the optical modulator 1 transmits the RF signal, which is input from the lead pin LP4, to the optical modulation section chip L through a transmission line F4 indicated by an arrow in FIGS. 1 and 2 and a bonding wire W4. In the following description, if it is not necessary to discriminate the transmission lines F1 to F4 from each other, the transmission lines F1 to F4 are collectively referred to as a transmission line F for convenience of explanation. In addition, in the following description, if it is not necessary to discriminate the bonding wires W1 to W4 from each other, the bonding wires W1 to W4 are collectively referred to as a bonding wire W.

The RF signals, which are respectively input from the lead pins LP1 to LP4, may RF signals indicating a plurality of pieces of information which are different from each other, or may be RF signals indicating the same information. In addition, the RF signals, which are respectively input from the lead pins LP1 to LP4, may be RF signals which are different in the number of vibrations, or may be RF signals having the same number of vibrations. In the following description, description will be given on the assumption that the RF signals respectively input from the lead pints LP1 to LP4 are RF signal which indicate the same information and have the same number of vibrations for convenience of explanation. Furthermore, the number of vibrations of each of the RF signals in this embodiment is set to a certain extent (for example, approximately several tens of [GHz]) in which an optical signal is modulated into a microwave by the optical modulation section chip L, but the number of vibrations may be set to another value. The RF signal is an example of an electrical signal.

The optical modulator 1 includes the lead pin LP, the optical modulation section chip L, a housing 2, the relay substrate B, two sheets of shields 3-1 and 3-2, and an insulator I. Furthermore, the optical modulator 1 may be provided with two or more sheets of the relay substrates. In addition, the optical modulator 1 maybe provided with three or greater sheets of shields, or only one sheet of shield. In the following description, it is not necessary to discriminate the shields 3-1 and 3-2, the shields 3-1 and 3-2 are collectively referred to as a shield 3.

As illustrated in FIG. 1, the lead pin LP is a coaxial line (that is, a glass lead pin) in which a central conductor CC and a ground conductor GC are provided in a concentric shape around a concentric axis, and a glass dielectric body DB is provided in a space between the central conductor CC and the ground conductor GC. In the lead pin LP of this embodiment, for example, a diameter of the central conductor CC is 0.3 mm, an inner diameter of the ground conductor GC is 1.6 mm, and a dielectric constant of the glass dielectric body DB is 4. Instead of the diameters and the dielectric constant, other diameters or other dielectric constants may be employed. Here, an arrow S illustrated in FIG. 1 represents a transmission direction of the RF signal that is transmitted by the central conductor CC of the lead pin LP. Furthermore, the lead pin LP is an example of a second transmission line.

The optical modulation section chip L includes a substrate containing lithium niobate, and modulates an optical signal input to the substrate containing lithium niobate from the light source (not illustrated) by using the RF signal that is input to the optical modulator 1. The optical modulation section chip L is an example of a modulation section.

The housing 2 is a metallic container in which the lead pin LP, the relay substrate B, the shield 3, and the optical modulation section chip L are provided on an inner side thereof. For example, the housing 2 is formed from a steel special use stainless (SUS) material and the like. Furthermore, the housing 2 in this embodiment is set to have a rectangular parallelepiped shape, but other shapes can be employed.

The relay substrate B is a substrate provided with the transmission line F through which the RF signal input through the lead pin LP is transmitted. In addition, the relay substrate B is a substrate in which the transmission line F is provided in an upper layer. However, instead of this configuration, the relay substrate B may be a substrate in which transmission lines are respectively provided in both of the upper layer and a lower layer, and the transmission lines in the both layers are connected by a via. The transmission line F is an example of a first transmission line. In addition, as illustrated in FIG. 1, the relay substrate B is provided on the insulator I that is provided on a bottom surface side in an internal space of the housing 2. The relay substrate B transmits the RF signal, which is input from the flexible cable C through the lead pin LP, to the optical modulation section chip L through the transmission line F and the bonding wire W which are provided in the relay substrate B.

The RF signal is transmitted to the transmission line F provided in the relay substrate B through the lead pin LP. In other words, the RF signal passes through the lead pin LP, and is transmitted in a direction (vertical direction) in which the relay substrate B and the insulator I are laminated as illustrated in FIG. 1. In addition, the RF signal is transmitted from the lead pin LP to the bonding wire W by the transmission line F that is provided in the upper layer of the relay substrate B. The RF signal, which is transmitted to the bonding wire W, is transmitted to the optical modulation section chip L through the bonding wire W, and modulates an optical signal. Furthermore, in the above-described relay substrate B, a position at which the lead pin LP or the transmission line F is provided, a shape of the lead pin LP or the transmission line F, and the like are illustrative only, and there is no limitation thereto. In addition, the transmission line F in FIG. 2 is illustrated to come into contact with the ground conductor GC of the lead pin LP for simplification of the drawing. However, actually, the transmission line F is provided in the relay substrate B not to come into contact with the ground conductor GC of the lead pin LP.

Figure 3:
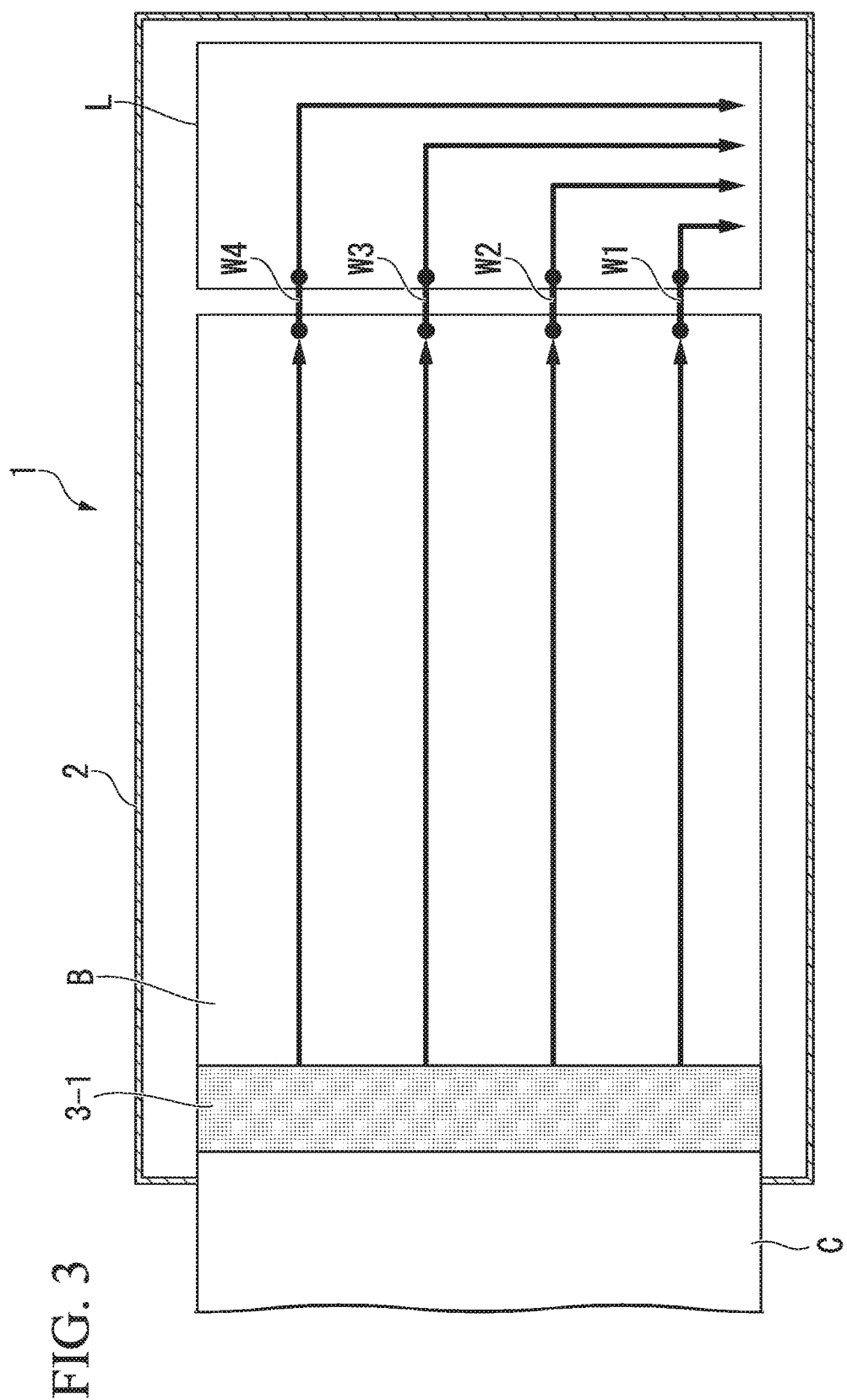
FIG. 3 is a view illustrating an example of the inside of the housing 2 illustrated in FIG. 1 when seen from a vertically upward side to a vertically downward side.

For example, the shield 3-1 is a plate member that covers a range including an immediately upward side of the lead pin LP in the upper layer of the relay substrate B illustrated in FIG. 2. Furthermore, the shield 3-1 is a member that is provided separately from the housing 2. In addition, a material of the shield 3-1 is a conductive material, and examples thereof include gold, aluminum, copper, and the like. Here, the shield 3-1 will be described with reference to FIG. 3. FIG. 3 is a view when an example of the inside of the housing 2 illustrated in FIG. 1 is seen from a vertically upward side to a vertically downward side. Furthermore, the shield 3-1 may be a plate member that covers the entirety of the upper layer of the relay substrate B illustrated in FIG. 2.

In addition, the shield 3-1 shields a radiation component of the RF signal (that is, an electrical signal), which is radiated from an immediately upward side of each of the lead pins LP illustrated in FIG. 2 toward an inner space (an internal upper surface of the housing 2) of the housing 2.

Figure 4:
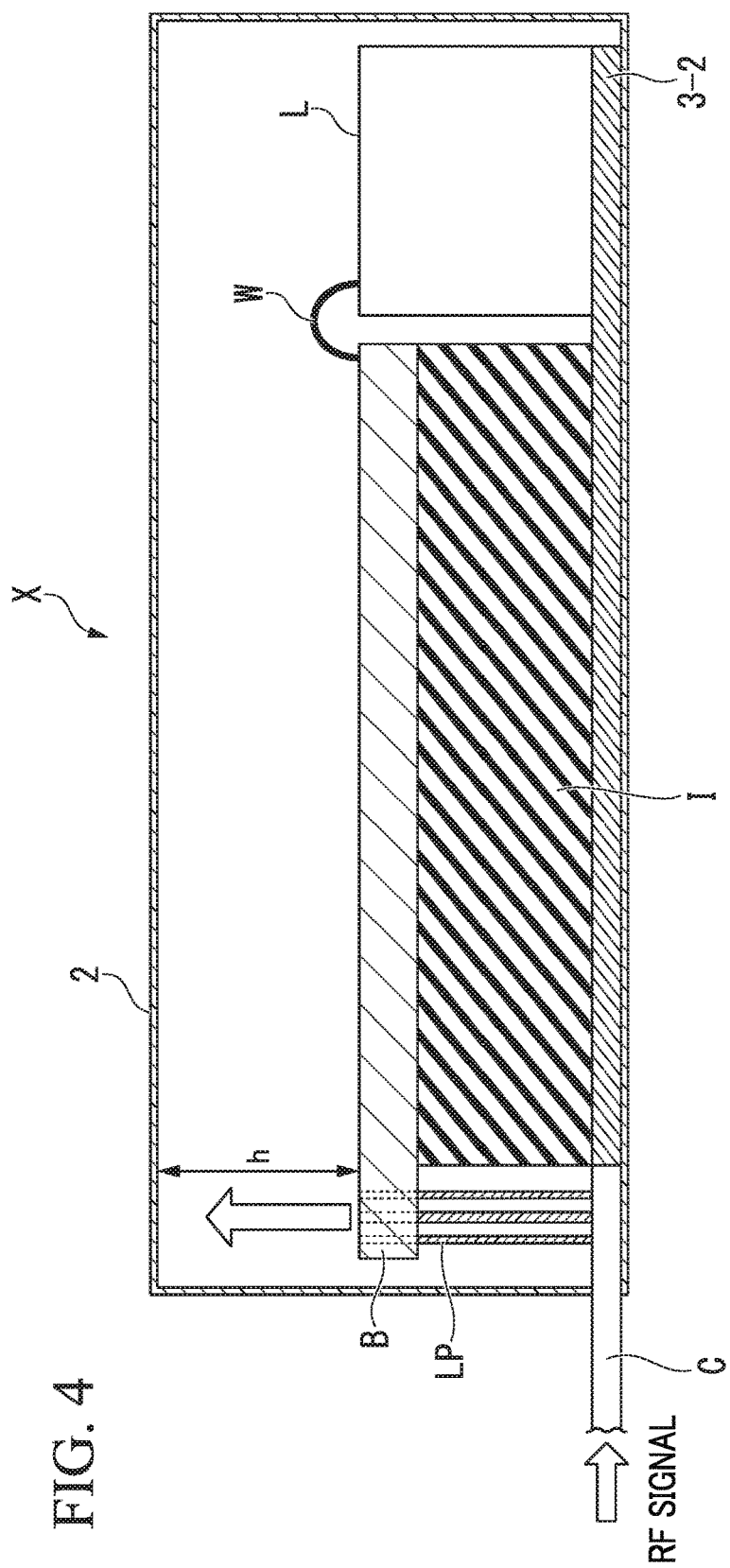
FIG. 4 is a view illustrating a configuration example of an optical modulator X that is not provided with a shield 3-1.

Furthermore, a surface of the lead pin LP when the lead pin LP is seen from an immediately upper side is an example of an emission surface of a radiation component of an electrical signal. Here, description will be given of the radiation component of the RF signal which is shielded by the shield 3-1 with reference to FIG. 4. FIG. 4 is a view illustrating a configuration example of an optical modulator X that is not provided with the shield 3-1. In addition, in FIG. 4, the transmission line F is omitted.

When the optical modulator X is not provided with the shield 3-1, the lead pin LP emits a radiation component of an RF signal to an internal space of the housing 2 in an immediately upward direction of the lead pin LP (a direction from the insulator I to the relay substrate B as illustrated in FIG. 4). In the following description, the radiation component of the RF signal is simply referred to as a radiation component for convenience of explanation. In FIG. 4, an arrow, which is illustrated on an immediately upward side of the lead pin LP, represents the radiation component. Emission of the radiation component from the lead pin LP is a phenomenon caused by the lead pin LP that functions as an antenna during transmission of the RF signal by the lead pin LP. When the radiation component, which is radiated in an immediately upward direction of the lead pin LP, is radiated to an internal space of the housing 2, the housing 2 reflects the radiation component.

When the reflection occurs, if a predetermined condition is satisfied, the radiated radiation component and the reflected radiation component cause interference, and thus the cavity resonance phenomenon occurs. The above-described predetermined condition represents a case where ½ wavelength of the RF signal is equal to a distance from a position from which the radiation component is radiated to a position from which the radiation component is reflected (for example, a height h illustrated in FIG. 4 in a case of a radiation component radiated from the lead pin LP). For example, when the height h is set to 3 mm, a transmission distance at which the radiation components are recoupled is 6 mm. In this case, when the frequency of the RF signal is in the vicinity of 25 GHz, the cavity resonance phenomenon occurs, and transmission characteristics of the RF signal deteriorate due to the cavity resonance phenomenon as described later.

Figure 5:
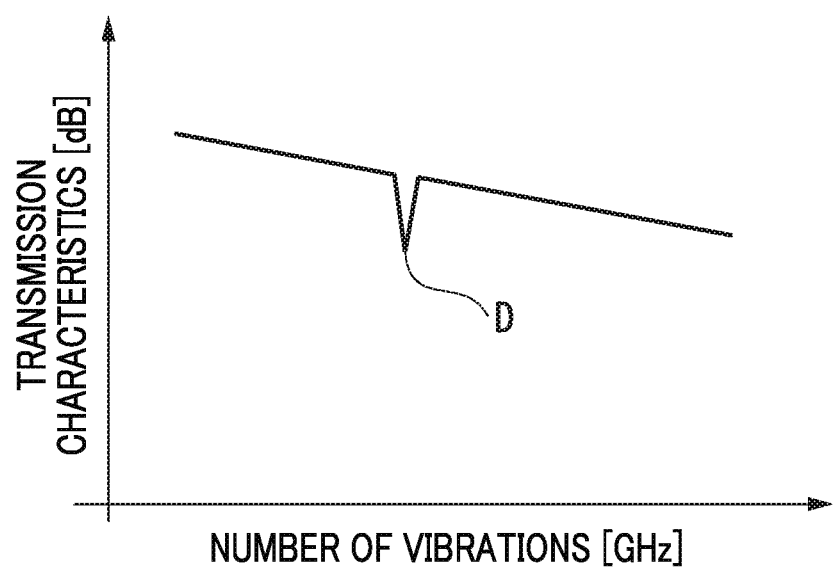
FIG. 5 is a view illustrating an example of a relationship between transmission characteristics of an RF signal that is transmitted by the optical modulator X from a flexible cable C to an optical modulation section chip L, and the number of vibrations of the RF signal.

In a case where the cavity resonance phenomenon occurs, transmission characteristics of the RF signal, which is transmitted by the optical modulator X from the flexible cable C to the optical modulation section chip L, deteriorate due to an effect of a radiation component that causes resonance. FIG. 5 is a view illustrating an example of a relationship between transmission characteristics of the RF signal that is transmitted by the optical modulator X from the flexible cable C to the optical modulation section chip L, and the number of vibrations of the RF signal. In the following description, the transmission characteristics of the RF signal, which is transmitted by the optical modulator X from the flexible cable C to the optical modulation section chip L, is simply referred to transmission characteristics for convenience of explanation.

The horizontal axis of a graph illustrated in FIG. 5 represents the number of vibrations (for example, a unit is [GHz]) of an RF signal. Furthermore, a wavelength of the RF signal is proportional to a reciprocal of the number of vibrations. Accordingly, FIG. 5 illustrates a relationship between the number of vibrations of the RF signal and the above-described transmission characteristics. The vertical axis of the graph illustrated in FIG. 5 illustrates the transmission characteristics (a unit is [dB]). As illustrated in FIG.

5, it can be seen that as the number of vibrations of the RF signal increases (that is, as the wavelength of the RF signal decreases), the transmission characteristics tends to decrease. The decrease tendency occurs due to transmission efficiency in the optical modulator X (when the transmission efficiency is 100%, the decrease tendency does not occur). In addition, from the graph illustrated in FIG. 5, a deep D, which occurs when the RF signal has a predetermined number of vibrations, is confirmed. The deep D represents a site at which the transmission characteristics rapidly decrease in the vicinity of the predetermined number of vibrations of the RF signal. The deep D occurs due to the above-described cavity resonance phenomenon.

The shield 3-1 covers the range including an immediately upward side of the lead pin LP in the upper layer of the relay substrate B and shields a radiation component, which is radiated from an immediately upward side of the lead pin LP in order for the deep D, which occurs due to the cavity resonance phenomenon, not to occur. In addition, it is desirable for the shield 3-1 to be grounded. With regard to a method of grounding the shield 3-1, in this example, as illustrated in FIG. 1, the shield 3-1 is connected to the housing 2 with the wire G, but the shield 3-1 may be grounded by another method. In this configuration, when the shield 3-1 shields a part of the radiation component, the shield 3-1 does not function as an antenna. As a result, the shield 3-1 can effectively shield the radiation component without emitting the radiation component into a cavity between the housing 2 and the relay substrate B. Furthermore, the shield 3-1 may not be grounded. In this case, it is desirable to optimize shielding of the radiation component by any method (that is, to suppress the radiation component radiated from the shield 3-1).

The shield 3-2 is connected the housing 2 in a direct connection manner or an indirect connection manner through a wire and the like.

In addition, as is the case with the shield 3-1, the shield 3-2 shields a radiation component that is radiated from the lead pin LP. The shield 3-2 shields a radiation component that is radiated from an immediately downward side of the lead pin LP. In addition, the shield 3-2 bonds the housing 2 and the insulator I in such a manner that the housing 2 and the insulator I are not broken due to a volume variation caused by heat. In addition, in addition to the insulator I, the optical modulation section chip L illustrated in FIG. 1 is also provided on an upper side of the shield 3-2. In addition, a material of the shield 3-2 is a conductive material, and examples of the material include gold, aluminum, copper, and the like.

As described above, the optical modulator 1 according to this embodiment includes the relay substrate B, the transmission line F that is provided on a flat surface of the relay substrate B and transmits the RF signal along the flat surface, the lead pin LP that is a member provided separately from the relay substrate B, is electrically connected to the transmission line F, and transmits the RF signal, which is input from an outer side (for example, a signal source and the like), to the transmission line F from a direction that is not included in the flat surface of the relay substrate B, the modulation unit that modulates an optical signal by using the RF signal that is transmitted by the transmission line F and the lead pin LP, and the shield 3-1 that shields the radiation component that is radiated from the lead pin LP. According to this, the optical modulator 1 can suppress deterioration of the transmission characteristics of the RF signal.

<Second Embodiment>

Figure 6:
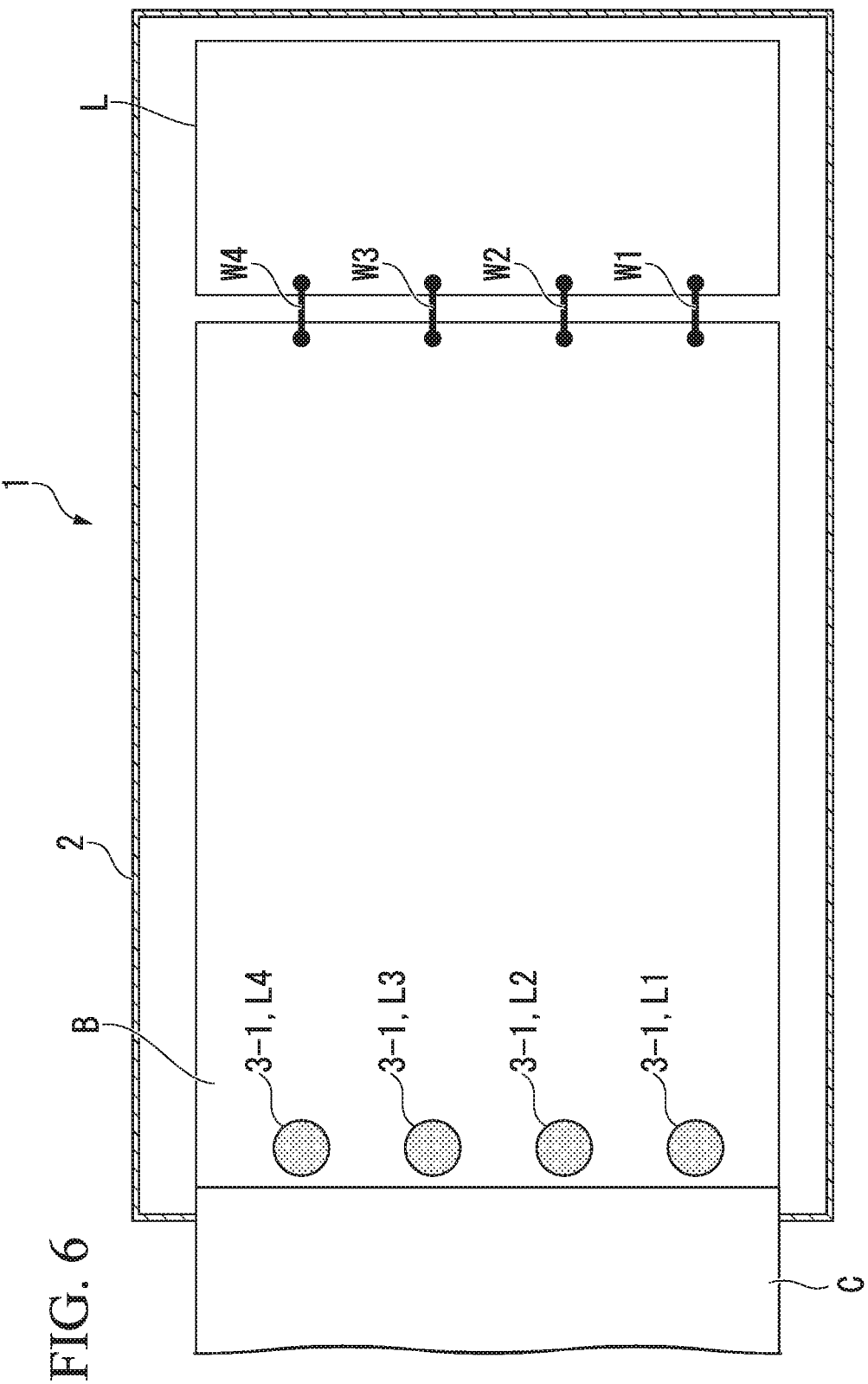
FIG. 6 is a view illustrating an example of the inside of a housing 2 of an optical modulator 1 according to a second embodiment when seen from a vertically upward side to a vertically downward side.

Hereinafter, a second embodiment of the invention will be described with reference to the accompanying drawings. Furthermore, in the second embodiment, the same reference numeral will be given to the same constituent unit as in the first embodiment, and description thereof will be omitted. A shield 3-1 of an optical modulator 1 according to the second embodiment is a disk-shaped member, which is provided only on an immediately upward side of the lead pin LP in the relay substrate B as illustrated in FIG. 6 to cover the lead pin LP, instead of the plate member that covers a range including an immediately upward side of the lead pin LP in the upper layer of the relay substrate B illustrated in FIG. 2. FIG. 6 is a view illustrating an example of the inside of a housing 2 of the optical modulator 1 according to the second embodiment when seen from a vertically upward side to a vertically downward side. Furthermore, in FIG. 6, connection between the shield 3-1 and the housing 2, and the transmission line F are omitted.

As illustrated in FIG. 6, the shield 3-1 is provided only on an immediately upward side of the lead pin LP.

Figure 7:
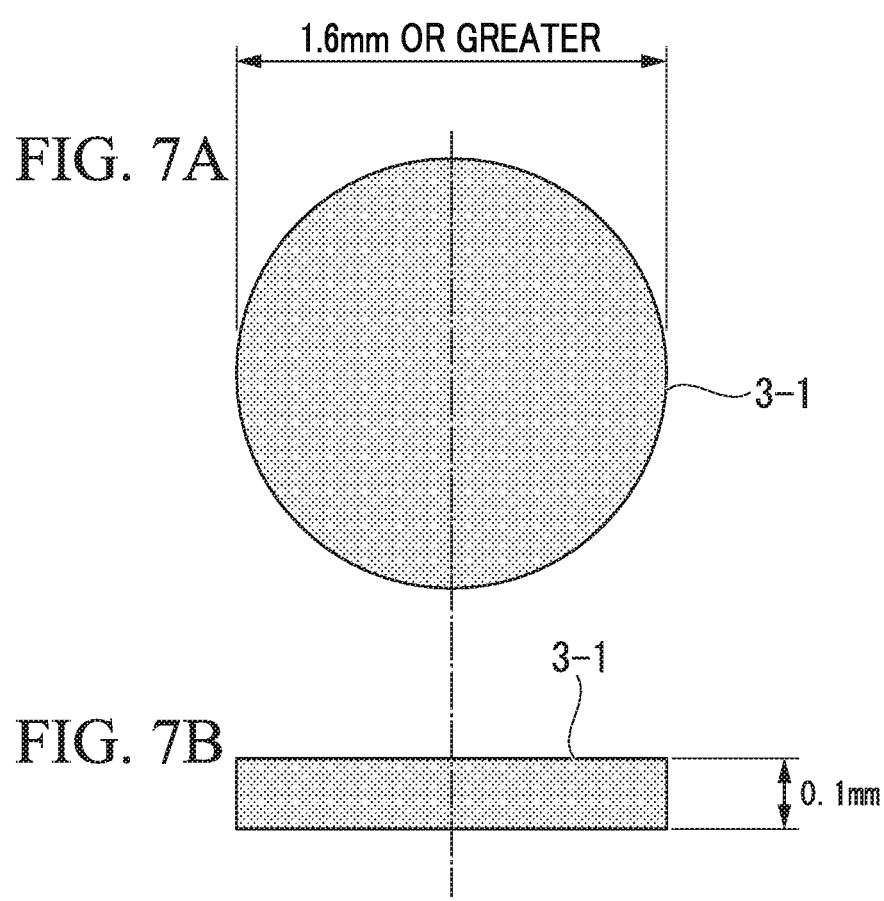
FIGS. 7A and 7B are views illustrating an example of a top plan view and a side view of a shield 3-1 according to the second embodiment.

Here, in a case where a radiation component is radiated from the lead pin LP in which a diameter of the central conductor CC is 0.3 mm, an inner diameter of the ground conductor GC is 1.6 mm, and a dielectric constant of the glass dielectric body DB is 4, the shield 3-1 has a structure as illustrated in FIGS. 7A and 7B. Accordingly, the shield 3-1 can sufficiently shield a radiation component that is radiated from the lead pin LP. A state capable of sufficiently shielding the radiation component represents the following state. Specifically, even when the above-described cavity resonance phenomenon occurs due to the radiation component leaked without being shielded, the cavity resonance phenomenon occurs only to a certain extent in which the deep D does not occur in the transmission characteristics of the optical modulator 1. In addition, the shield 3-1 is provided only on an immediately upward side of the lead pin LP, and thus it is possible to more reliably suppress the cavity resonance phenomenon that occurs when the radiation component is leaked to a space between the shield 3-1 and the housing 2 due to any phenomenon. FIGS. 7A and 7B are views illustrating an example of a top plan view and a side view of the shield 3-1 according to the second embodiment.

FIG. 7A illustrates a top plan view of the shield 3-1. In addition, FIG. 7B illustrates a side view of the shield 3-1. As illustrated in FIG. 7A, an upper surface of the shield 3-1 has an area that is equal to or greater than a circular area (range capable of covering the lead pin LP) in which a diameter is 1.6 mm. In addition, as illustrated in FIG. 7B, a lateral surface of the shield 3-1 has a thickness of 0.1 mm or greater. Furthermore, the dimensions are examples of a case where the lead pin LP, in which the diameter of the central conductor CC is 0.3 mm, the inner diameter of the ground conductor GC is 1.6 mm, and the dielectric constant of the glass dielectric body DB is 4, is provided in the relay substrate B. In the lead pin LP, if parts or the entirety of the diameter of the central conductor CC, the inner diameter of the ground conductor GC, and the dielectric constant of the dielectric body DB are changed, the diameter or the thickness of the shield 3-1 is different from a value illustrated in FIGS. 7A and 7B in accordance with the change. In addition, the shield 3-1 may not have a circular shape as long as the shield 3-1 can cover the lead pin LP, and may have a rectangular shape or other shapes. As described above, when the shield 3-1 is provided to cover only an immediately upward side of the lead pin LP, it is possible to sufficiently shield the radiation component that is radiated from the lead pin LP.

As described above, in the optical modulator 1 according to the second embodiment, the circular shield 3-1 is provided only on an immediately upward side of the lead pin LP in the upper layer of the relay substrate B. According to this, the optical modulator 1 can attain the same effect as in the first embodiment.

<Third Embodiment>

Hereinafter, a third embodiment of the invention will be described with reference to the accompanying drawings. Furthermore, in the third embodiment, the same reference numeral will be given the same constituent unit as in the first embodiment, and description thereof will be omitted. A shield 3-1 of an optical modulator 1 according to the third embodiment is a bonding wire that is provided in such a manner that two wires intersect each other on an immediately upward side of the lead pin LP in the relay substrate B as illustrated in FIG. 8, or a ribbon that is thicker than the bonding wire instead of the plate member that covers a range including an immediately upward side of the lead pin LP in the upper layer the relay substrate B illustrated in FIG. 2.

Figure 8:
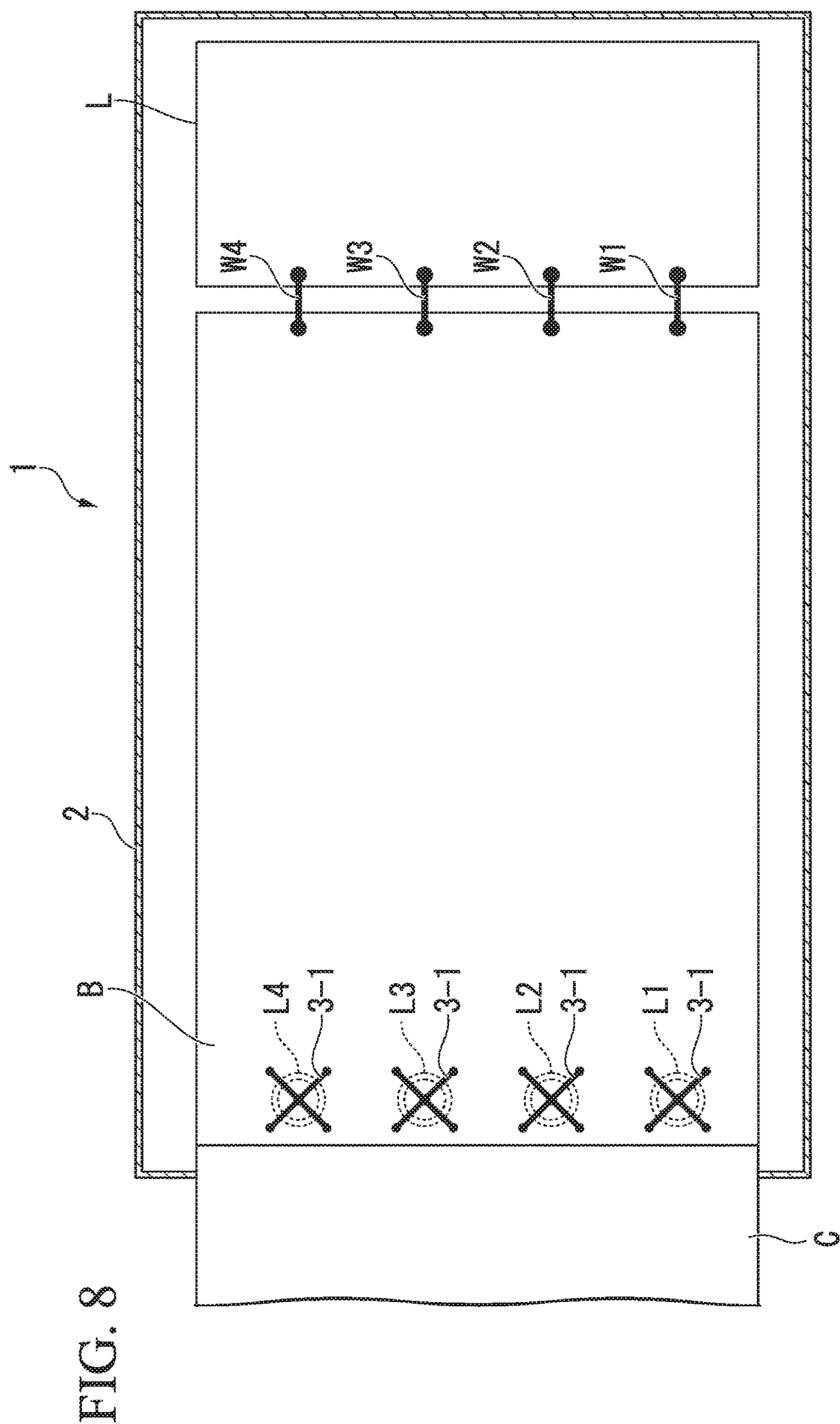
FIG. 8 is a view illustrating an example of the inside of a housing 2 of an optical modulator 1 according to a third embodiment when seen from a vertically upward side to a vertically downward side.

FIG. 8 is a view illustrating an example of the inside of a housing 2 of the optical modulator 1 according to the third embodiment when seen from a vertically upward side to a vertically downward side. Furthermore, in FIG. 8, connection between the shield 3-1 and the housing 2 and the transmission line F are omitted. As illustrated in FIG. 6, the shield 3-1 is provided only on an immediately upward side of the lead pin LP. Here, in a case where a radiation component is radiated from the lead pin LP in which the diameter of the central conductor CC is 0.3 mm, the inner diameter of the ground conductor GC is 1.6 mm, and the dielectric constant of the glass dielectric body DB is 4, the shield 3-1 has a structure illustrated in FIG. 9, and thus it is possible to reduce a radiation component that is radiated from the lead pin LP. At this time, the radiation component is reduced to a certain extent in which the radiation component is "sufficiently shielded" as described in the second embodiment.

Figure 9:
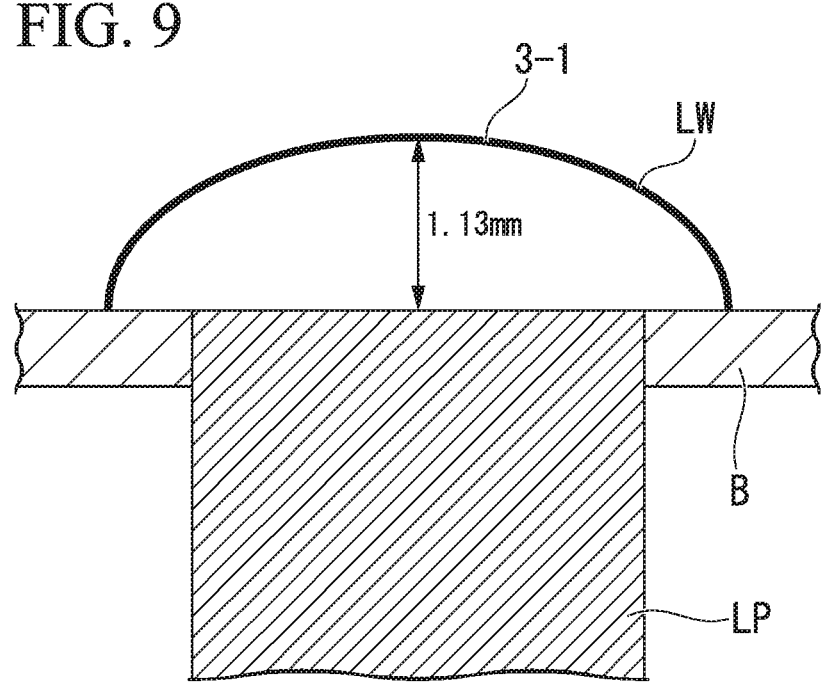
FIG. 9 is a view illustrating an example of a side view of a shield 3-1 according to the third embodiment.

FIG. 9 is a view illustrating an example of a side view of the shield 3-1 according to the third embodiment. Furthermore, in FIG. 9, only one of two wires of the shield 3-1 illustrated in FIG. 8 is illustrated, and the other wire is omitted. As illustrated in FIG. 9, the shield 3-1 is provided on an immediately upward side of the lead pin LP in such a manner that a height from the center of the lead pin LP to the shield 3-1 becomes 1.13 mm, and a length LW of the wire of the shield 3-1 becomes 2.77 mm. Furthermore, the dimensions are examples of a case where the lead pin LP, in which the diameter of the central conductor CC is 0.3 mm, the inner diameter of the ground conductor GC is 1.6 mm, and the dielectric constant of the glass dielectric body DB is 4, is provided in the relay substrate B. In the lead pin LP, if parts or the entirety of the diameter of the central conductor CC, the inner diameter of the ground conductor GC, and the dielectric constant of the dielectric body DB are changed, the diameter or the thickness of the shield 3-1 is different from a value illustrated in FIG. 9 in accordance with the change.

In addition, in the shield 3-1, wires having a structure illustrated in FIG. 9 are provided to intersect each other on an immediately upward side of the lead pin LP as illustrated in FIG. 8. When a radiation component radiated from the lead pin LP is reduced due to the structure of the shield 3-1 illustrated in FIG. 9, the radiation component radiated from the lead pin LP causes the cavity resonance phenomenon only to a certain extent in which the deep D does not occur in the transmission characteristics of the RF signal in the optical modulator 1. According to this, the shield 3-1 can suppress the cavity resonance phenomenon due to the radiation component that is radiated from the lead pin LP. As a result, it is possible to suppress occurrence of the deep D in the transmission characteristics of the optical modulator 1.

Furthermore, for example, the shield 3-1 can employ a configuration of using one or greater wires such as a configuration in which two wires are arranged in parallel to each other on an immediately upward side of the lead pin LP, a configuration in which one wire is provided, or a configuration in which three or greater wires are provided instead of the configuration in which the two wires intersect each other on an immediately upward side of the lead pin LP.

As described above, in the optical modulator 1 according to the third embodiment, the shield 3-1 as a bonding wire, in which two wires are provided to intersect each other on an immediately upward side of the lead pin LP in the relay substrate B, is provided on the upper layer of the relay substrate B. According to this, the optical modulator 1 can attain the same effect as in the first embodiment.

<Fourth Embodiment>

Hereinafter, a fourth embodiment of the invention will be described with reference to the accompanying drawings. Furthermore, in the fourth embodiment, the same reference numeral will be given the same constituent unit as in the first embodiment, and description thereof will be omitted. A shield 3-1 of an optical modulator 1 according to the fourth embodiment is a mesh-shaped member, in which two wires are provided to intersect each other on an immediately upward side of the lead pin LP in the relay substrate B as illustrated in FIG. 10, instead of the plate member that covers a range including an immediately upward side of the lead pin LP in the upper layer of the relay substrate B illustrated in FIG. 2.

Figure 10:
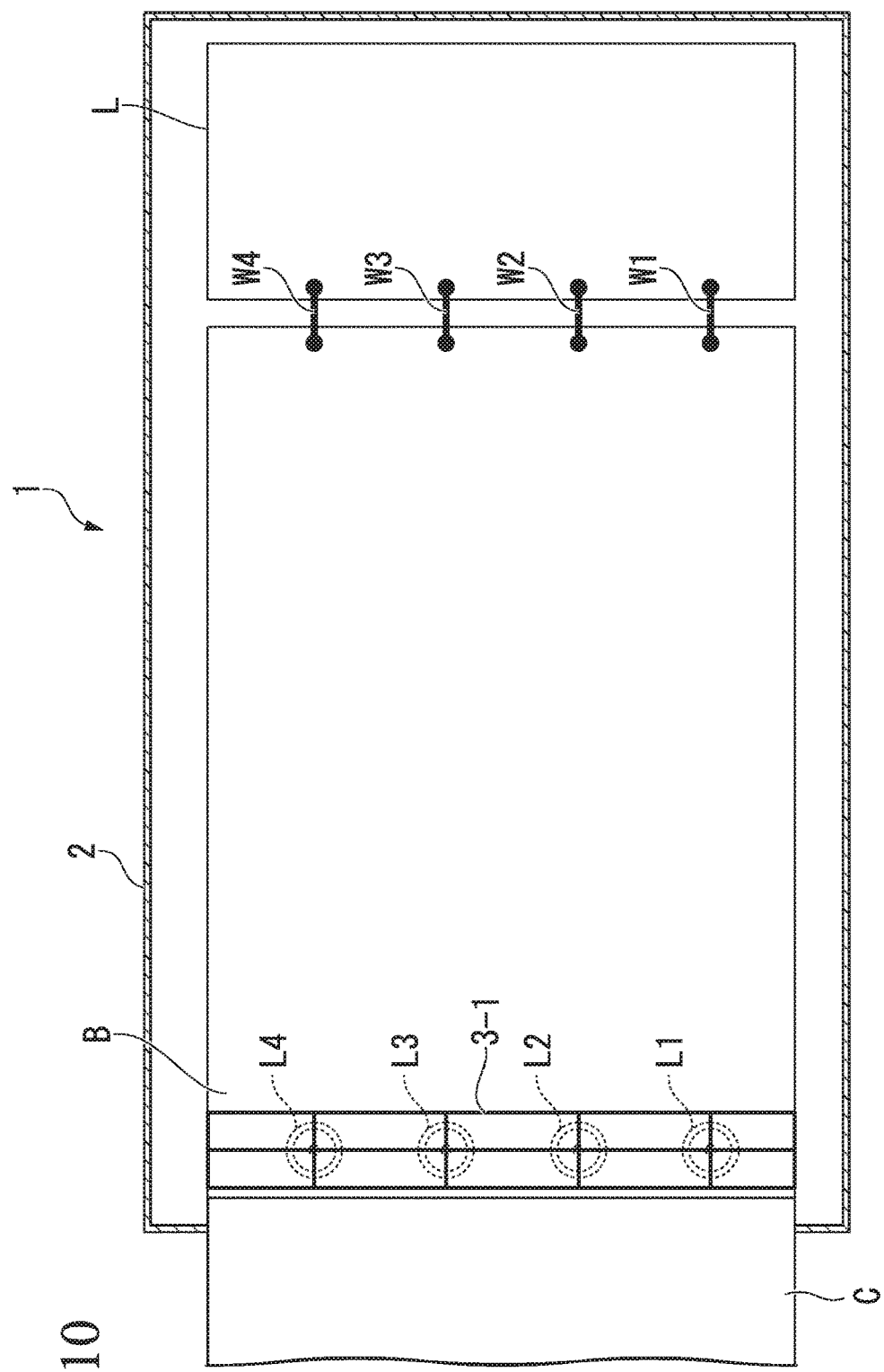
FIG. 10 is a view illustrating an example of a side view of a shield 3-1 according to a fourth embodiment.

FIG. 10 is a view illustrating an example of a side view of the shield 3-1 according to the fourth embodiment. As illustrated in FIG. 10, the shield 3-1 that is a mesh-shaped member reduces a radiation component radiated from the lead pin LP by using two wires that pass through an immediately upward side of the lead pin LP. At this time, the radiation component is reduced to a certain extent in which the radiation component is "sufficiently shielded" as described in the second embodiment. According to this, the shield 3-1 suppresses the cavity resonance phenomenon due to the radiation component that is radiated from the lead pin LP. As a result, the shield 3-1 can suppress occurrence of the deep D in the transmission characteristics of the optical modulator 1. Furthermore, the number of the wires, which pass through an immediately upward side of the lead pin LP, may be a numerical value other than two as long as the radiation component radiated from the lead pin LP can be sufficiently shielded.

As described above, in the optical modulator 1 according to the fourth embodiment, the shield 3-1 as the mesh-shaped member, in which two wires are provided to intersect each other on an immediately upward side of the lead pin LP in the relay substrate B, is provided on an upper layer of the relay substrate B. According to this, the optical modulator 1 can attain the same effect as in the first embodiment.

<Fifth Embodiment>

Hereinafter, a fifth embodiment of the invention will be described. Furthermore, in the fifth embodiment, the same reference numeral will be given to the same constituent unit as in the first embodiment, and description thereof will be omitted. An optical switch 4 according to the fifth embodiment includes the optical modulator 1 described in the first to fourth embodiments, and a switch that switches on/off (switches an output) of an optical signal that is input from a light source (not illustrated) to a substrate that contains lithium niobate by an optical modulation section chip L of the optical modulator 1.

Furthermore, in a case where a plurality of output destinations exist with respect to an optical signal that is modulated in the optical modulator 1, the optical switch 4 according to the fifth embodiment may employ a configuration provided with a switch that selects any one of the plurality of output destinations instead of the configuration provided with the switch that switches on/off (switches an output) of the optical signal that is input from the light source (not illustrated) to a substrate that contains lithium niobate by the optical modulation section chip L of the optical modulator 1.

As described above, the optical switch 4 according to the fifth embodiment is provided with the optical modulator 1 described in the first to fourth embodiments, and thus the optical switch 4 can attain the same effect as in the first embodiment.

Furthermore, the shield 3-1 may have a configuration in which parts or the entirety of the configurations in the above-described embodiments are combined.

Hereinbefore, embodiments of the invention have been described in detail with reference to the accompanying drawings, but a specific configuration is not limited to the embodiments, and modifications, substitutions, deletions, and the like can be made in a range not departing from the gist of the invention.

<Background of Invention>

Hereinafter, description will be given of the background of the invention with reference to the optical modulator X, which is not provided with the shield 3-1 illustrated in FIG. 4, as an example. In the optical modulator X, the transmission characteristics of the RF signal, which is input to the optical modulator X, may deteriorate due to the cavity resonance phenomenon that is caused by reflection of a radiation component of the RF signal, which radiated into the housing 2 from the lead pin or the via V provided in the relay substrate B toward a vertically upward side or a vertically downward side, from an inner wall surface of the housing 2.

As an effective solution for deterioration of the transmission characteristics in the cavity resonance phenomenon, there is a method in which an internal space of the housing 2 is made to be smaller to further raise a cavity resonance frequency than a frequency band that is used by the optical modulator X, or a method in which the cavity resonance at the maximum usage frequency band in the optical modulator X is set to an attenuated state.

However, the height of the housing 2 is restricted depending on the size of components which are mounted on an inner side of the housing 2. For example, it is necessary to secure an electronic component mounting space on an inner side of the optical modulator X in a substrate in which a bias monitoring photodetector mounted on the optical modulation section chip L, a chip capacitor or a chip resistor which includes an impedance transformer disposed on the relay substrate B, a termination resistor that terminates the RF signal are mounted, and the like. In addition, similar to a polarization multiplexing modulator, in a configuration in which a plurality of optical components such as a polarization rotation element, a retardation film, and a collimator lens which have a size of approximately several millimeters are mounted, it is difficult to reduce the height of the housing 2.

In addition, in a case of using a ferroelectric crystal material such as $LiNbO_3$ as a material of the optical modulation section chip L, typical examples of a signal wiring on a chip that is used include a co-planar waveguide (CPW) having a high aspect ratio and a wide gap (a ratio of a height to a width of a signal line is great and is typically 1 or greater, and an area between ground electrodes is 50 μm or greater). In this case, when a conductor exists on an upper side of a signal line of the optical modulation section chip L, the transmission characteristics and the like deteriorate. As an example, in a case where a metallic housing inner wall exists at a position of a height that is approximately two or less times a distance between ground electrodes of the CPW, this configuration has an effect on a propagation speed of a microwave or impedance (frequency dependency of an effective refractive index), thereby leading to deterioration of the transmission characteristics.

In addition, a length of the optical modulation section chip L in an optical propagating direction may be only several millimeters due to a wide band or a low drive voltage. This is one cause for occurrence of overlapping of a plurality of substrate modes and signal deterioration.

As described above, in the optical modulator X, it is difficult to reduce the height of the housing 2, and thus there is a demand for any method of shielding a radiation component of the RF signal that is radiated from the lead pin or the via V which is provided in the relay substrate B toward a vertically upward side or a vertically downward side. The optical modulator 1 can shields the radiation component of the RF signal, which is radiated from the lead pin or the via V which is provided in the relay substrate B toward a vertically upward side or a vertically downward side, by using the shield 3-1 and the shield 3-2. As a result, it is possible to more reliably suppress deterioration of the transmission characteristics in comparison to the optical modulator X.

REFERENCE SIGNS LIST

1: Optical modulator
2: Housing
3, 3-1, 3-2: Shield
4: Optical switch

The invention claimed is:

1. An optical modulator, comprising:
   a relay substrate;
   a first transmission line that is provided on a flat surface of the relay substrate, and transmits an electrical signal, of a predetermined frequency, along the flat surface;
   a second transmission line that is provided separately from the relay substrate, is electrically connected to the first transmission line, and transmits, to the first transmission line, the electrical signal that has been input from an outer side in a direction that is not included in the flat surface;
   a modulation unit that modulates an optical signal by using the electrical signal that is transmitted by the first transmission line and the second transmission line;
   a housing that accommodates the relay substrate and has an internal space with a height that is at least ¼ times a wavelength of the electrical signal, the height being measured between the housing and the second transmission line and measured in a normal direction of the flat surface; and a shield disposed within the housing and configured to suppress a cavity resonance phenomenon by shielding a radiation component of the electrical signal that is radiated toward the internal space from the second transmission line.

2. The optical modulator according to claim 1, wherein the shield is a member that covers at least a radiation surface of the radiation component from the second transmission line.

3. The optical modulator according to claim 1, wherein the housing accommodates the relay substrate and the modulation unit.

4. The optical switch according to claim 1 wherein the housing accommodates the relay substrate and the modulation unit.

5. An optical modulator, comprising:
a relay substrate;
a first transmission line that is provided on a flat surface of the relay substrate, and transmits an electrical signal along the flat surface;
a second transmission line that is provided separately from the relay substrate, is electrically connected to the first transmission line, and transmits, to the first transmission line, the electrical signal that has been input from an outer side in a direction that is not included in the flat surface;
a modulation unit that modulates an optical signal by using the electrical signal that is transmitted by the first transmission line and the second transmission line; a shield that shields a radiation component of the electrical signal that is radiated from the second transmission line, and wherein the shield is a bonding wire that passes overhead at least a radiation surface of the radiation component from the second transmission line.

6. An optical switch, comprising:
a relay substrate;
a first transmission line that is provided on a flat surface of the relay substrate, and transmits an electrical signal, of a predetermined frequency, along the flat surface;
a second transmission line that is provided separately from the relay substrate, is electrically connected to the first transmission line, and transmits, to the first transmission line, the electrical signal that has been input from an outer side in a direction that is not included in the flat surface;
a modulation unit that modulates an optical signal by using the electrical signal that is transmitted by the first transmission line and the second transmission line;
a housing that accommodates the relay substrate and has an internal space with a height that is at least ¼ times a wavelength of the electrical signal, the height being measured between the housing and the second transmission line and measured in a normal direction of the flat surface;
a shield disposed within the housing and configured to suppress a cavity resonance phenomenon by shielding a radiation component of the electrical signal that is radiated toward the internal space from the second transmission line; and
a switch that switches an output of the optical signal.

* * * * *